(12) United States Patent  (10) Patent No.: US 8,579,094 B2
Moorman et al.  (45) Date of Patent: Nov. 12, 2013

(54) HYDRAULIC CONTROL SYSTEM FOR AN AUTOMATIC TRANSMISSION HAVING A THREE PATH TORQUE CONVERTER CONTROL SUBSYSTEM

(75) Inventors: Steven P. Moorman, Dexter, MI (US); John R. Czoykowski, Grosse Pointe Park, MI (US); Chinar S. Ghike, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 208 days.

(21) Appl. No.: 12/964,538

(22) Filed: Dec. 9, 2010

(65) Prior Publication Data

US 2011/0168509 A1 Jul. 14, 2011

Related U.S. Application Data

(60) Provisional application No. 61/293,996, filed on Jan. 11, 2010.

(51) Int. Cl.
*F16D 29/00* (2006.01)

(52) U.S. Cl.
USPC ............................ 192/3.3; 192/3.29; 192/3.58

(58) Field of Classification Search
USPC ......................................................... 192/3.3
See application file for complete search history.

(56) References Cited

U.S. PATENT DOCUMENTS

| 4,653,352 | A | 3/1987 | Nakao et al. |
|---|---|---|---|
| 4,944,202 | A | 7/1990 | Gierer |
| 5,079,704 | A * | 1/1992 | Sakai et al. ...................... 701/57 |
| 5,145,045 | A * | 9/1992 | Wakahara ..................... 192/3.29 |
| 5,441,459 | A | 8/1995 | Inukai et al. |
| 5,802,490 | A * | 9/1998 | Droste ............................ 701/51 |
| 6,715,597 | B1 | 4/2004 | Buchanan et al. |
| 7,300,375 | B2 | 11/2007 | Petrzik |
| 7,487,866 | B2 | 2/2009 | Kruse et al. |
| 2001/0036878 | A1 | 11/2001 | Itou et al. |
| 2002/0060113 | A1 | 5/2002 | Harries |
| 2002/0119864 | A1 | 8/2002 | Harries |
| 2003/0075408 | A1 | 4/2003 | Alfredsson |
| 2004/0038765 | A1 | 2/2004 | Fujimine et al. |
| 2007/0175726 | A1 | 8/2007 | Combes et al. |
| 2008/0207392 | A1 | 8/2008 | Staudinger et al. |
| 2008/0210032 | A1 | 9/2008 | Uberti et al. |
| 2009/0151495 | A1 | 6/2009 | Garabello et al. |
| 2009/0157271 | A1 | 6/2009 | Garabello et al. |

FOREIGN PATENT DOCUMENTS

| CN | 101233347 | 7/2008 |
|---|---|---|
| DE | 2141564 A1 | 2/1973 |
| DE | 4117736 C1 | 5/1992 |
| DE | 4320353 A1 | 1/1994 |

(Continued)

*Primary Examiner* — David D Le
*Assistant Examiner* — Mark Manley

(57) ABSTRACT

A hydraulic control system for a transmission includes a first source of pressurized hydraulic fluid for providing a first flow of hydraulic fluid, a second source of pressurized hydraulic fluid for providing a second flow of hydraulic fluid, and a torque converter control subsystem for controlling a torque converter and a torque converter clutch. The torque converter control subsystem includes a torque converter control valve and a solenoid. The solenoid is multiplexed to the torque converter control valve and the torque converter clutch. The torque converter control valve is operable to control a flow of hydraulic fluid to the torque converter and to other subsystems within the hydraulic control system.

19 Claims, 6 Drawing Sheets

(56) References Cited

FOREIGN PATENT DOCUMENTS

| | | |
|---|---|---|
| DE | 29714652 U1 | 10/1997 |
| DE | 19921301 A1 | 11/1999 |
| DE | 19849488 A1 | 5/2000 |
| DE | 19931973 A1 | 1/2001 |
| DE | 10134115 A1 | 1/2003 |
| DE | 10243282 A1 | 4/2004 |
| DE | 102005029963 A1 | 2/2007 |
| DE | 102005029964 A1 | 3/2007 |
| EP | 0477564 A2 | 4/1992 |
| EP | 1469235 A1 | 10/2004 |
| EP | 1519082 A1 | 3/2005 |
| EP | 1645786 A2 | 4/2006 |
| EP | 2151586 A2 | 2/2010 |
| FR | 2808065 A1 | 10/2001 |
| JP | 58102651 A | 8/1983 |
| JP | 2007010145 A | 1/2007 |
| WO | WO9705410 A1 | 2/1997 |
| WO | WO9919644 A1 | 4/1999 |
| WO | WO2009037170 A1 | 3/2009 |
| WO | WO2010028745 A2 | 3/2010 |

* cited by examiner

US 8,579,094 B2

HYDRAULIC CONTROL SYSTEM FOR AN AUTOMATIC TRANSMISSION HAVING A THREE PATH TORQUE CONVERTER CONTROL SUBSYSTEM

CROSS-REFERENCE

This application claims priority to U.S. Provisional Application No. 61/293,996, filed on Jan. 11, 2010, which is hereby incorporated in its entirety herein by reference.

TECHNICAL FIELD

The invention relates to a control system for an automatic transmission, and more particularly to an electro-hydraulic control system having a three path torque converter control subsystem.

BACKGROUND

A typical automatic transmission includes a hydraulic control system that is employed to provide cooling and lubrication to components within the transmission and to actuate a plurality of torque transmitting devices. These torque transmitting devices may be, for example, friction clutches and brakes arranged with gear sets or in a torque converter. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to various subsystems including lubrication subsystems, cooler subsystems, torque converter clutch control subsystems, and shift actuator subsystems that include actuators that engage the torque transmitting devices. The pressurized hydraulic fluid delivered to the shift actuators is used to engage or disengage the torque transmitting devices in order to obtain different gear ratios.

While previous hydraulic control systems are useful for their intended purpose, the need for new and improved hydraulic control system configurations within transmissions which exhibit improved performance, especially from the standpoints of efficiency, responsiveness and smoothness, is essentially constant. Accordingly, there is a need for a hydraulic control system that controls a torque converter lock up clutch while maintaining hydraulic fluid pressure within the torque converter that is efficient and cost-effective.

SUMMARY

A hydraulic control system for a transmission is provided. The hydraulic control system includes a first source of pressurized hydraulic fluid for providing a first flow of hydraulic fluid, a second source of pressurized hydraulic fluid for providing a second flow of hydraulic fluid, and a torque converter control subsystem for controlling a torque converter and a torque converter clutch. The torque converter control subsystem includes a torque converter control valve and a solenoid. The solenoid is multiplexed to the torque converter control valve and the torque converter clutch. The torque converter control valve is operable to control a flow of hydraulic fluid to the torque converter and to other subsystems within the hydraulic control system.

Further features, aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1A:
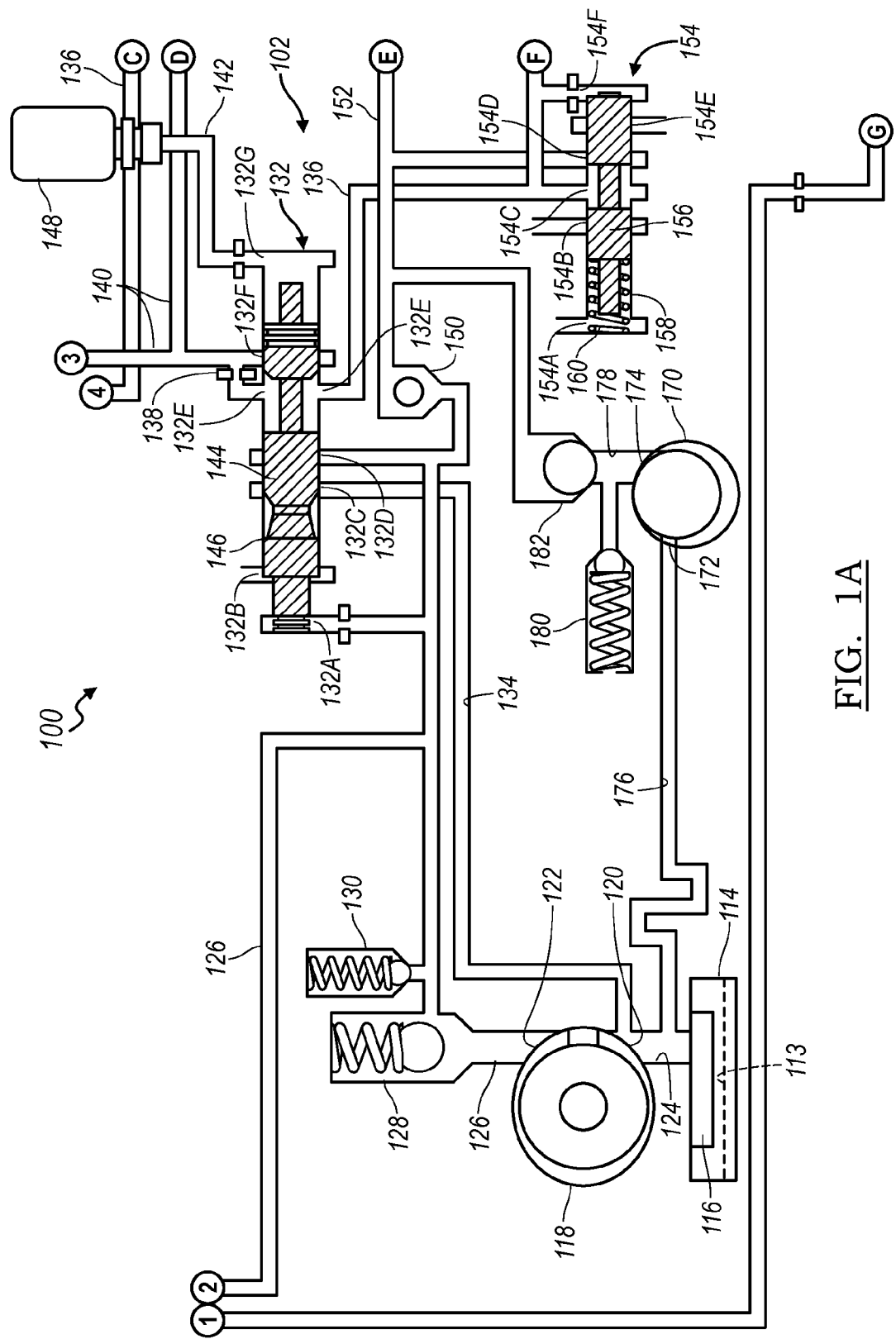
FIGS. 1A-1D are diagrams of a hydraulic control system according to the principles of the present invention.

With combined reference to FIGS. 1A-1D, a hydraulic control system according to the principles of the present invention is generally indicated by reference number 100. The hydraulic control system 100 is operable to control torque transmitting mechanisms, such as synchronizers, clutches, and brakes within a transmission, as well as providing lubrication and cooling to components within the transmission and to control a torque converter coupled to the transmission. The hydraulic control system 100 includes a plurality of interconnected or hydraulically communicating subsystems including a pressure regulator subsystem 102, a torque converter control subsystem 104, a cooler flow subsystem 106, a lubrication control subsystem 108, an electronic transmission range selection (ETRS) control subsystem 110, and a clutch control subsystem 112.

With reference to FIG. 1A, the pressure regulator subsystem 102 is operable to provide and regulate pressurized hydraulic fluid 113, such as oil, throughout the hydraulic control system 100. The pressure regulator subsystem 102 draws hydraulic fluid 113 from a sump 114. The sump 114 is a tank or reservoir preferably disposed at the bottom of a transmission housing to which the hydraulic fluid 113 returns and collects from various components and regions of the transmission. The hydraulic fluid 113 is forced from the sump 114 and communicated through a sump filter 116 and throughout the hydraulic control system 100 via a pump 118. The pump 118 is preferably driven by an engine (not shown) and may be, for example, a gear pump, a vane pump, a gerotor pump, or any other positive displacement pump. The pump 118 includes an inlet port 120 and an outlet port 122. The inlet port 120 communicates with the sump 114 via a fluid line 124. The outlet port 122 communicates pressurized hydraulic fluid 113 to a fluid line 126. The fluid line 126 is in communication with a spring biased one-way valve 128, a spring biased blow-off safety valve 130, and a pressure regulator valve 132. The one-way valve 128 is used to selectively prevent hydraulic flow into the main pump 118 when the main pump 118 is non-operational. The safety valve 130 is set at a relatively high predetermined pressure and if the pressure of the hydraulic fluid in the fluid line 126 exceeds this pressure, the one-way valve 128 opens momentarily to relieve and reduce the pressure of the hydraulic fluid.

The pressure regulator valve assembly 132 includes ports 132A-G. Port 132A is in communication with fluid line 126. Port 132B is an exhaust port that communicates with the sump 114. Port 132C is in communication with a fluid line 134 that communicates with fluid line 124 (i.e. feeds back into the inlet port 120 of the pump 118). Port 132D is in communication with fluid line 126. Fluid port 132E is in communication with a fluid line 136 and via a flow restriction orifice 138 with a fluid line 140. Fluid port 132F is in communication with the fluid line 140. Fluid line 140 bifurcates into at least two parallel branches 140A and 140B, each having located therein variously sized flow restriction orifices or gaskets 141A and 141B, respectively, shown in FIG. 1B. Finally, port 132G is in communication with a fluid line 142.

The pressure regulator valve assembly 132 further includes a valve 144 slidably disposed within a bore 146. The valve 144 automatically changes position to dump excess flow from fluid line 126 until a pressure balance is achieved between the commanded pressure and the actual pressure. The valve 144 is modulated by a variable bleed solenoid 148 that communicates with fluid line 142. For example, the solenoid 148 commands a fluid pressure by sending pressurized hydraulic fluid to port 132G to act on the valve 144. Simultaneously, fluid pressure from fluid line 126 enters port 132A and acts on the opposite side of the valve 144. Pressure balance between the commanded pressure from the solenoid 148 and pressure within line 126 is achieved as the valve 144 moves and allows selective communication between port 132D and port 132C, thereby bleeding pressure from fluid line 126.

Fluid line 126 also communicates downstream of the pressure regulator valve assembly 132 with a one-way valve 150. The one-way valve 150 allows fluid communication from fluid line 126 to a fluid line 152 and prevents fluid communication from fluid line 152 to fluid line 126. Fluid line 152 communicates with a feed limit valve assembly 154.

The feed limit valve assembly 154 limits the maximum pressure of hydraulic fluid to the torque converter control subsystem 104, the cooler control subsystem 106 as well as various control solenoids, as will be described below. The feed limit valve assembly 154 includes ports 154A-F. Ports 154C and 154F are in communication fluid line 136 and therefore port 132E of the pressure regulator valve 132. Port 154D is in communication with fluid line 152. Ports 154A, 154B, and 154E are exhaust ports that communicate with the sump 114.

The feed limit valve assembly 154 further includes a valve 156 slidably disposed within a bore 158. The valve 156 automatically changes position to reduce flow from fluid line 152 (i.e. line pressure from the pump 118) to fluid line 136. For example, the valve 156 is biased to a first position by a spring 160. In the first position, at least a partial flow of fluid from line 152 communicates from port 154D through the feed limit valve assembly 154 to port 154C and then to fluid line 136. As the pressure within fluid line 136 increases, feedback pressure acting on the valve 156 via port 154F moves the valve 156 against the spring 160, thereby further reducing the pressure of the hydraulic fluid within fluid line 136, until a pressure balance is achieved on the valve 156. By controlling the pressure to fluid line 136 which communicates through the pressure regulator valve 132 to fluid line 140, the feed limit valve 154 and the pressure regulator valve 132 control the flow of pressure feeding the TCC control subsystem 104 and the lubrication control subsystem 108.

The pressure regulator subsystem 102 further includes an alternate source of hydraulic fluid that includes an auxiliary pump 170. The auxiliary pump 170 is preferably driven by an electric engine, battery, or other prime mover (not shown) and may be, for example, a gear pump, a vane pump, a gerotor pump, or any other positive displacement pump. The auxiliary pump 170 includes an inlet port 172 and an outlet port 174. The inlet port 172 communicates with the sump 114 via a fluid line 176. The outlet port 174 communicates pressurized hydraulic fluid to a fluid line 178. The fluid line 178 is in communication with a spring biased blow-off safety valve 180 and a one-way valve 182. The safety valve 180 is used to relieve excess pressure in fluid line 178 from the auxiliary pump 170. The one-way valve 182 is in communication with fluid line 152 and is operable to allow hydraulic fluid flow from fluid line 178 to fluid line 152 and prevent hydraulic fluid flow from fluid line 152 to fluid line 178. Therefore, during normal operating conditions, fluid flow from the pump 118 is prevented from backfilling the auxiliary pump 170 by the one-way valve 182. During high efficiency modes of operation when the engine, and therefore the pump 118, are inactive, and the auxiliary pump 170 is engaged, fluid flow from the auxiliary pump 170 is prevented from backfilling the pump 118 by the one-way valve 150.

Figure 1B:
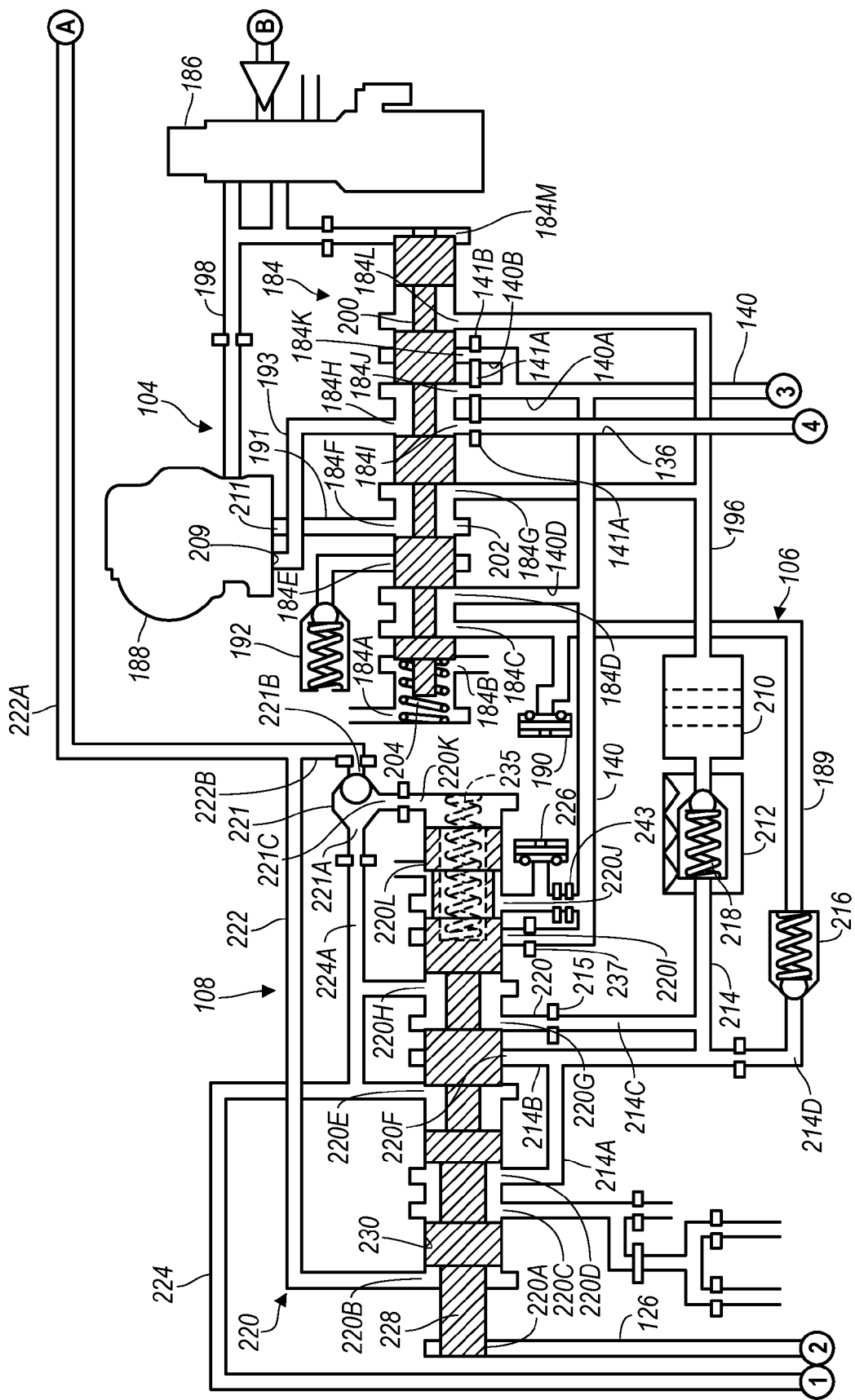

With specific reference to FIG. 1B, the TCC subsystem 104 receives pressurized hydraulic fluid from the feed limit valve assembly 154 via fluid line 136 and the pressure regulator valve assembly 132 via fluid line 140. The TCC subsystem 104 includes a TCC control valve assembly 184 and a solenoid 186 that modulates pressure to a torque converter 188. The torque converter 188 includes a torque converter clutch 188A. The torque converter clutch 188A is operable to directly, mechanically couple an output from an engine (not shown) to an input of the transmission (not shown).

The TCC control valve assembly 184 includes ports 184A-M. Ports 184A and 184B are exhaust ports that communicate with the sump 114. Port 184C communicates with a fluid line 189. Fluid line 189 communicates with a TCC control valve pressure switch 190. Port 184D communicates with a branch 140D of fluid line 140. Branch 140D is disposed in parallel relationship with branches 140A and 140B. Port 184E communicates with a safety blow-off valve 192 that release pressurized hydraulic fluid when the torque converter clutch 188A is on or engaged, as will be described below. Port 184F communicates with the torque converter 188 via a fluid line 191. Ports 184G and 184L communicate with a fluid line 196. Fluid line 196 in turn communicates with the cooler subsystem 106. Port 184H communicates with the torque converter 188 via a fluid line 193. Port 184I is in fluid communication with fluid line 136 through a fluid restriction orifice or gasket 195. Port 184J and 184K are each in communication with branches 140A and 140B, respectively, through orifices 141A and 141B, respectively. Finally, port 184M communicates with a fluid line 198. Fluid line 198 communicates with the solenoid 186 and with the torque converter 188.

The solenoid 186 is a control device operable to control a flow of pressurized hydraulic fluid delivered at line pressure from fluid line 187. The solenoid 186 is preferably a high flow, variable force solenoid that is normally closed, though other types of actuating and control devices may be employed without departing from the scope of the present invention.

Figure 2A:
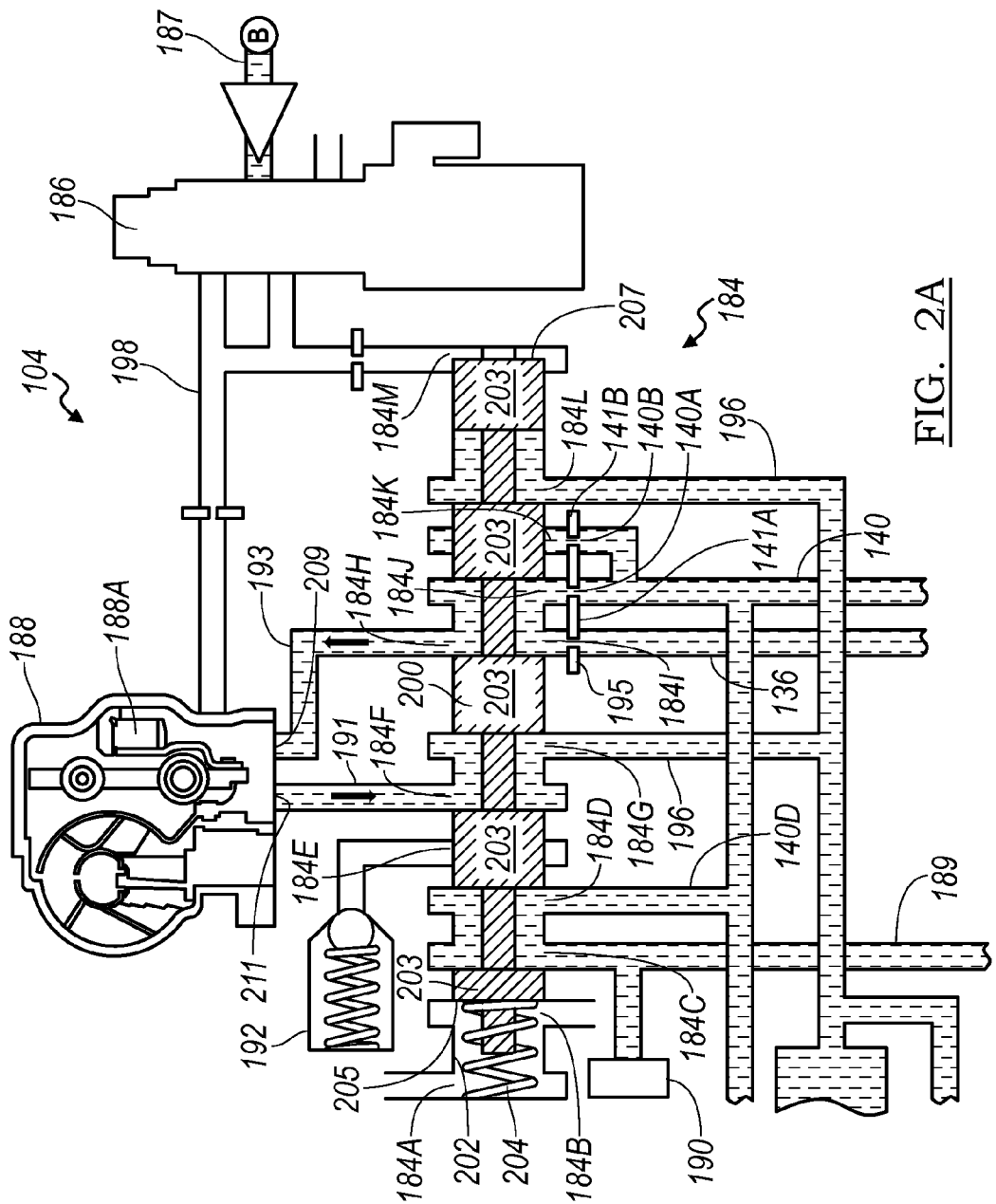
FIG. 2A is a diagram of a portion of the hydraulic control system in a first state according to the principles of the present invention.
Figure 2B:
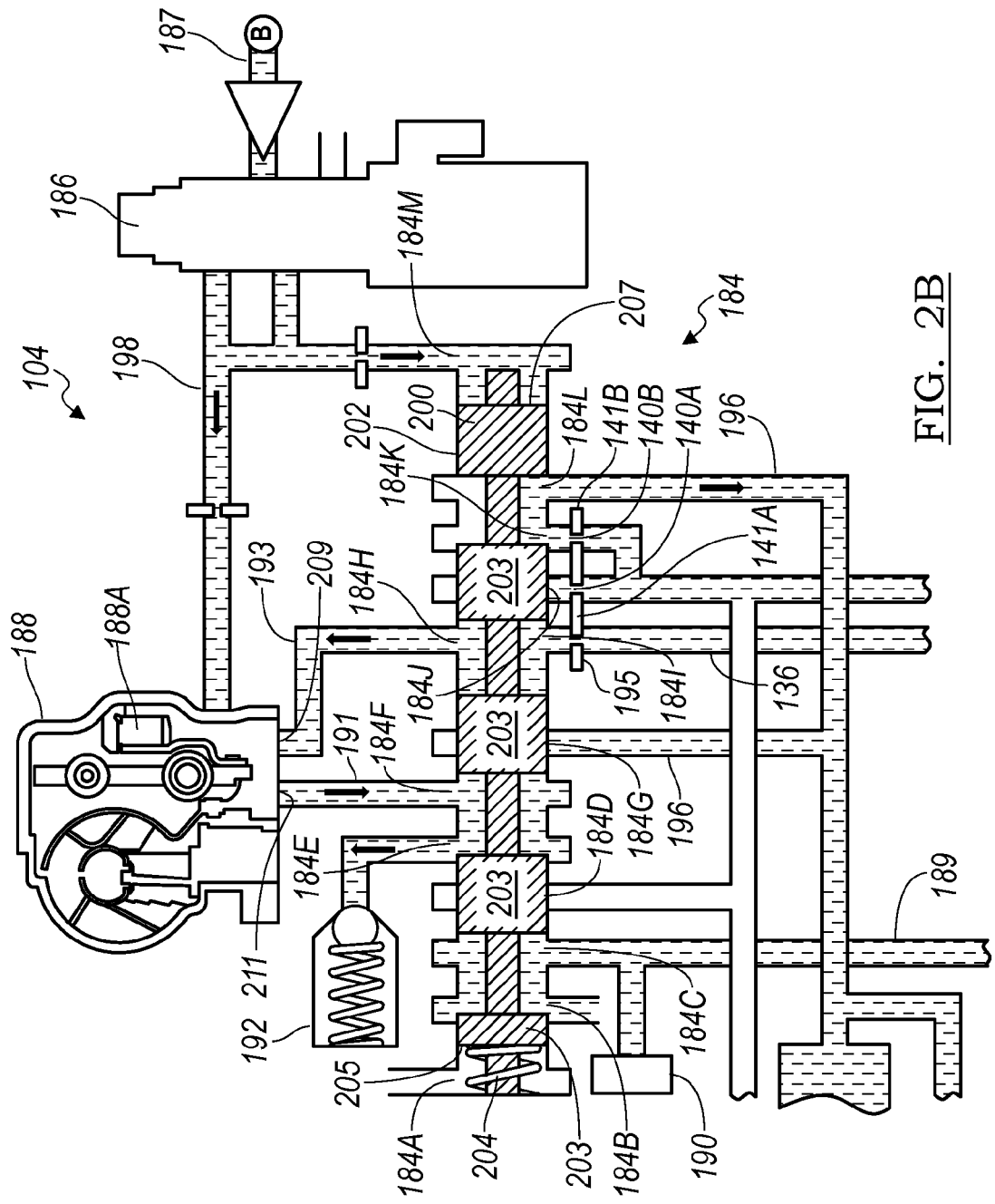
FIG. 2B is a diagram of a portion of the hydraulic control system in a second state according to the principles of the present invention.

The TCC control valve assembly 184 further includes a valve 200 slidably disposed within a bore 202. In the example provided, the valve 200 is a spool valve having a plurality of lands 203 disposed along a length of the valve 200. The lands 203 are sealingly engaged with the bore 202 and are operable, depending upon the position of the valve 200, to isolate and allow communication between the ports 184A-M. The valve 200 is moveable between at least two positions including a first or de-stroked position, shown in FIG. 2A, and a second or stroked position, shown in FIG. 2B. A biasing member or spring 204 is disposed at an end of the TCC valve assembly 184 and engages an end 205 of the valve 200 to bias the valve 200 to the de-stroked position. In the de-stroked position, port 184C communicates with port 184D, port 184E is isolated, port 184F communicates with port 184G, port 184H communicates with ports 184I and 184J, port 184K is isolated, and port 184L is isolated. Port 184M remains in communication with fluid line 198 and solenoid 186.

The valve 200 is moved to the stroked position when the solenoid 186 is energized or opened and a flow of pressurized hydraulic fluid communicates from the solenoid 186 through fluid line 198 to port 184M. As the pressure of the hydraulic fluid acting on an end 207 of the valve 200 opposite end 205 is increased past a threshold, the valve 200 strokes to the stroked position shown in FIG. 2B. In the stroked position, port 184C communicates with port 184B, port 184D is isolated, port 184E communicates with port 184F, port 184G is isolated, port 184I communicates with port 184H, port 184J is isolated, and port 184K communicates with port 184L.

The operation of the TCC control subsystem 104 will now be described. During operation of the transmission having the hydraulic control system 100 where the torque converter 188 is acting as a fluid coupling between the engine and the transmission in order to increase torque, the hydraulic control system 100 is operable to provide a flow of hydraulic fluid to the torque converter 188 to cool and lubricate the components of the torque converter 188. Accordingly, in a first operating condition where the torque converter 188 is acting as a fluid coupling and the torque converter clutch 188A is disengaged, the solenoid 186 is closed. Therefore, the valve 200 of the TCC control valve assembly 184 is in the de-stroked position. A flow of pressurized hydraulic fluid communicates from the feed limit valve 154 via fluid line 136 and orifice 195 to port 184I. Also, a flow of pressurized hydraulic fluid communicates from the pressure regulation valve 132 via fluid line 140 and branch 140A through orifice 141A to port 184J. The flows of hydraulic fluid are combined and exit the TCC valve assembly via port 184H. From there the flow of pressurized hydraulic fluid communicates out port 184H to an inlet 209 in the torque converter 188 via fluid line 193. The hydraulic fluid circulates within the torque converter 188 providing cooling, lubrication and fluid coupling, and exits via an outlet port 211 in the torque converter 188. The returning flow of hydraulic fluid communicates via fluid line 191 to port 184F in the TCC valve assembly 184. The returning flow of hydraulic fluid exits the TCC valve assembly 184 through port 184G which communicates the returning flow of hydraulic fluid to the cooler subsystem 106. In addition, a flow of hydraulic fluid from fluid line 140 is communicated to port 184D via branch 140D. The hydraulic fluid then exits the TCC valve assembly 184 via port 184C and communicates with the pressure sensor 190, thereby indicating the position of the valve 200 based on the pressure delivered to the sensor 190 through the TCC valve assembly 184.

During operation of the transmission having the hydraulic control system 100 where the torque converter 188 is no longer needed as a torque multiplier, the hydraulic control system 100 is operable to engage the torque converter clutch 188A while controlling the flow of hydraulic fluid to the cooler subsystem 106. Accordingly, in a second operating condition where the torque converter 188 is not acting as a fluid coupling and the torque converter clutch 188A is engaged, the solenoid 186 is opened. Therefore, pressurized hydraulic fluid exits the solenoid 186 and engages the torque converter clutch 188A while simultaneously providing a flow of hydraulic fluid to port 184M of the TCC valve assembly 184. As pressure of the hydraulic fluid acting on the valve 200 from port 184M via the solenoid 186 increases, a threshold is crossed where the valve 200 is shifted against the spring 204 and moved to the stroked position, shown in FIG. 2B. As the valve 200 shifts, hydraulic fluid from fluid line 140 is directed through the branches 140A-B and orifices 141A-B, thereby controlling the rate of hydraulic fluid flow to port 184H and therefore the rate of hydraulic fluid flow to the torque converter 188. In the stroked position, the flow of hydraulic fluid from fluid line 140 is communicated via branch 140B through orifice 141B to port 184K. This flow of hydraulic fluid then exits via port 184L and communicates with the cooler subsystem 106 via fluid line 196. Fluid flow via fluid line 136 communicates through orifice 195 to port 184I, which in turn exits via port 184H and communicates with the torque converter 188. Since orifice 195 is smaller than orifice 141A, the flow of fluid to the torque converter 188 is decreased. The flow of hydraulic fluid exits the torque converter 188 and communicates via fluid line 191 to port 184F, and from port 184F to the blow-off valve 192. The setting of the blow-off valve 192 controls the maximum pressure of the hydraulic fluid within the torque converter 188, thereby allowing the torque converter 188 to remain charged with hydraulic fluid below a maximum pressure. In addition, fluid line 189, and therefore pressure sensor 190, is cut-off from the flow of hydraulic fluid from fluid line 140 and fluid line 189 is exhausted via communication between port 184C and 184B. This drop in pressure within fluid line 189 is sensed by the pressure sensor 190, thereby indicating the position of the valve 200 based on the pressure delivered to the sensor 190 through the TCC valve assembly 184.

The cooler control subsystem 106 includes an oil cooler 210 and a fine micron oil filter 212. The oil cooler 210 is in communication with fluid line 196. The oil filter 212 is in communication with the oil cooler 210 and with a fluid line 214. Fluid line 214 includes three branches 214A-C that communicate with the lubrication control subsystem 108 and a fourth branch 214D that communicates with a spring biased one-way valve 216. Branch 214C includes a flow restricting orifice 215, or override orifice, used to control fluid flow through the lubrication subsystem 108, as will be described in greater detail below. The one-way valve 216 communicates with fluid line 189. If the pressure of the hydraulic fluid in the fluid line 214D exceeds a pressure threshold, the one-way valve 216 opens momentarily to relieve and reduce the pressure of the hydraulic fluid within fluid line 214D. The cooler control subsystem 106 further includes a spring biased blow-off safety valve 218 disposed either in parallel with the oil filter 210 or integrated within the oil filter 210 that allows hydraulic fluid to bypass the oil filter 210 in the event of inadequate cooler flow. The blow-off valve 218 is set at a predetermined pressure and if the pressure of the hydraulic fluid in the fluid line 196 exceeds this pressure, the blow-off valve 218 opens momentarily to increase the flow of hydraulic fluid from the cooler flow subsystem 106.

The lubrication control subsystem 108 regulates lubrication fluid pressure as a function of line pressure delivered from the pump 118 or auxiliary pump 170. Hydraulic fluid regulated by the lubrication control subsystem 108 lubricates and cools the various moving parts of the transmission and provides the source of hydraulic fluid for filling a clutch centrifugal compensator. The lubrication control subsystem 108 receives hydraulic fluid from the cooler flow subsystem 106 via fluid line 214.

The lubrication control subsystem 108 includes a lubrication regulator valve assembly 220 and a ball check valve 221. The ball check valve 221 includes three ports 221A-C. The ball check valve 221 closes off whichever of the ports 221A and 221B that is delivering the lower hydraulic pressure and provides communication between whichever of the ports 221A and 221B having or delivering the higher hydraulic pressure and the outlet port 221C.

The lubrication regulator valve assembly 220 includes ports 220A-L. Port 220A communicates with fluid line 126 and therefore receives line pressure from the pump 118. Port 220B communicates with a fluid line 222. Fluid line 222 includes two branches 222A and 222B. Branch 222A communicates with the ETRS subsystem 110 and branch 222B communicates with port 221B of the ball check valve 221. Ports 220C and 220L are exhaust ports that communicate with the sump 114. Port 220D communicates with fluid line 214A. Ports 220E and 220H communicate with a fluid line 224. Fluid line 224 includes a branch 224A that communicates with port 221A of the ball check valve 221. Ports 220I and 220J communicate with fluid line 140 and with a pressure switch 226. Finally, port 220K communicates with port 221C of the ball check valve 221.

The lubrication regulator valve assembly 220 further includes a valve 228 slidably disposed within a bore 230. The valve 228 has three functional positions: a basic regulating position, a supplemental regulating position, and an override position. The valve 228 is moved between the positions based on a balance of forces acting on each of a first end and a second end of the valve 228. The basic regulating position provides an output pressure via fluid line 224 that is proportional to the line pressure (i.e. the pressure in fluid line 126). In the basic regulating position, line pressure via fluid line 126 enters port 220A and acts on an end of the valve 228 against the bias of a spring 235. As the valve 228 strokes against the spring 235, port 220F communicates with port 220E. Accordingly, hydraulic fluid flow from the cooler subsystem 106 communicates from fluid line 214B to port 220F, through the valve 228, and out fluid port 220E to fluid line 224. Feedback pressure from fluid line 224 communicates through branch 224A, through the ball check valve 221, and into the valve assembly 220. The hydraulic fluid acts on the valve 228 and creates a balancing force against the line pressure which keeps the valve 228 in a position to regulate the fluid flow to fluid line 224. In addition, ports 220I, 220J, 220C, and 220G are isolated by the valve 228, which in turn keeps the fluid pressure within fluid line 140 high which in turn allows the pressure switch 226 to sense a high pressure thereby indicating that the valve 228 is regulating fluid flow to fluid line 224.

If the fluid flow from the cooler subsystem 106 drops sufficiently, the line pressure acting on the valve 228 from fluid line 126 will move the valve 228 to the supplemental or stroked position. In the supplemental position, not only is fluid flow from the cooler subsystem 106 increased by opening port 220F to port 220E, but in addition port 220I is allowed to communicate with fluid port 220H. Accordingly, fluid flow from the feed limit valve 154 is communicated to the lubrication control valve 220 via fluid line 140, thereby increasing the fluid flow to fluid line 224. A flow restriction orifice 237 in fluid line 140 limits the flow of hydraulic fluid to the lubrication control valve 220.

Finally, the override position is achieved by activating a solenoid 240 (see FIG. 1C) that is in communication with fluid line 222A. The override position is activated during low line pressures (i.e. when the pump 118 is operating at a reduced speed due to engine idling). Solenoid 240 is an on/off solenoid that is multiplexed with the ETRS subsystem 110, as will be described in greater detail below. The hydraulic fluid flow from the solenoid 240, when activated, communicates with the ball check valve 221 via fluid line 222A. The ball check valve 221 prevents the fluid flow from the solenoid 240 from entering fluid line 224. As the fluid flow from the solenoid 240 enters port 220K, the hydraulic fluid contacts the valve 228 and, along with the spring 235, moves the valve to a de-stroked position. In the override position, port 220F is isolated from port 220E. However, port 220G is allowed to communicate with port 220H. Fluid flow from the cooler subsystem 106 via fluid line 214C is reduced by the relatively narrow override orifice 215. In addition, port 220D, previously isolated, is allowed to communicate with port 220C. Therefore, fluid flow from the cooler subsystem 106 is further reduced as fluid flow is diverted through branch 214A to port 220D, from port 220D to port 220C, and out port 220A to the sump 114. Finally, port 220J is allowed to communicate with port 220L, thereby allowing the fluid flow from the feed limit valve 154 via fluid line 140 to exhaust to the sump 114. However, due to gasket slots 243 positioned upstream of the pressure switch 226, the pressure between the pressure switch 226 and the exhaust port 220L drops. The drop in pressure sensed by the pressure switch 226 confirms that the valve 228 is in the override position. The override position greatly reduces the flow of hydraulic fluid to fluid line 224 and therefore to the components of the transmission, thereby reducing the parasitic spin loss. The override position is used under low power generation conditions, such as engine idle.

The lubrication regulator valve pressure switch 226 and the TCC control valve pressure switch 190 cooperate to diagnose a stuck pressure regulator valve assembly 132 or a stuck feed limit valve assembly 154. A non-pressurized state is assigned to the TCC applied position of the TCC control valve assembly 184 and to the lubrication override position of the lubrication valve assembly 220. Both pressure switches 226, 190 are fed with hydraulic fluid pressurized by the feed limit valve assembly 154. Depending on the commanded state of the valve assemblies 184, 220, both pressure switches 226, 190 indicating no pressure can be used as a diagnostic signal.

Returning to FIG. 1C, and with continued reference to FIGS. 1A and 1B, the ETRS control subsystem 110 will now be described. The ETRS control subsystem 110 uses line pressure hydraulic fluid from the pump 118 or the auxiliary pump 170 via fluid line 152 to engage a range selection via the clutch actuator subsystem 112. The ETRS control subsystem 110 is controlled using the hydraulic fluid from the feed limit control valve assembly 154 via fluid line 136. The ETRS control subsystem 110 includes previously described solenoid 240 as well as three additional solenoids 242, 244, and 246. Each of the solenoids 240, 242, 244, 246 are normally low, on-off solenoids that are each supplied with hydraulic fluid via fluid line 136. Fluid line 136 further provides hydraulic fluid to solenoid 148 (FIG. 1A). The solenoids 240, 242, 244, and 246 are used to actuate an ETRS valve assembly 250, a latch valve assembly 252, and first and second mode valve assemblies 254, 256.

The ETRS valve assembly 250 includes ports 250A-H. Port 250A communicates with fluid line 222A. Port 250B communicates with a fluid line 260. Port 250C communicates with a fluid line 262. Port 250D communicates with fluid line 152. Port 250E communicates with a fluid line 264. Port 250F communicates with a fluid line 266. Fluid line 266 communicates with solenoid 242. Port 250G is a one way exhaust port that communicates with the sump 114 which is used to improve the response time for the ETRS valve assembly 250 to de-stroke during a return to Park under extreme cold operating conditions. Finally, port 250H is an exhaust port that communicates with the sump 114.

The ETRS valve assembly 250 further includes a valve 268 slidably disposed within a bore 270. The valve 268 is actuated to a stroked position or out-of-Park position by the solenoid 240 and by hydraulic fluid acting on valve 268 delivered via fluid line 262 and to a de-stroked position or Park position by a spring 272 and by hydraulic fluid acting on the valve 268 delivered via fluid line 266. In the out-of-Park position, solenoid 240 is opened and fluid from line 222A contacts the valve 268 and moves the valve 268 against the spring 272. In addition, fluid from line 262 which is sourced by line pressure via the mode valves 254 and 256 and fluid line 152, contacts the valve 268 to stroke the valve. In this condition, port 250D communicates with port 250E. Accordingly, line pressure hydraulic fluid from fluid line 152 communicates to port 250D, from port 250D through the ETRS valve assembly 250 to port 250E, and from port 250E to fluid line 264. Fluid line 264 communicates with a Park servo assembly 276. The hydraulic fluid enters the Park servo assembly 276. The Park servo assembly 276 includes a piston 278 that moves upon contact by the hydraulic fluid, thereby mechanically disengaging a Park system (not shown). A Park inhibit solenoid assembly 281 is connected to the Park servo assembly 276. The Park inhibit solenoid assembly 281 a mechanical latching solenoid to hold the system out of Park if an operator wishes to have the vehicle mobile with the engine off. The Park inhibit solenoid assembly 281 also preferably includes two position switches, one mechanical and one Hall-effect, that confirm the position of the Park system to the engine controller and transmission controller to be used for diagnostic purposes.

In the Park position, solenoid 240 is closed and solenoid 242 is opened and the valve 268 is de-stroked by the spring 272 and by hydraulic fluid delivered from the solenoid 242 via line 266. In this position, port 250E communicates with port 250H and the Park servo assembly 276 exhausts, thereby engaging the Park system. The valve 268 is configured such that the spring 272 and hydraulic fluid from solenoid 242 will overcome the forces exerted on the valve 268 by any one of hydraulic fluid delivered by solenoid 240 and hydraulic fluid delivered via fluid line 262. If both sources of hydraulic fluid are present, the forces exerted on the valve 268 by hydraulic fluid from the solenoid 240 and hydraulic fluid delivered via fluid line 262 will overcome forces exerted on the valve 268 by the spring 272 and by hydraulic fluid from solenoid 242, thereby assuring a failed signal can be overcome. The Park controls are configured so that if all hydraulic pressure is lost in the hydraulic control system 100, the Park system is engaged.

The first mode valve assembly 254 includes ports 254A-K. Port 254A communicates with a fluid line 280. Port 254B communicates with a fluid line 282. Port 254C communicates with fluid line 152. Port 254D communicates with a fluid line 284. Port 254E communicates with a fluid line 286. Port 254F and 254J are exhaust ports that communicate with the sump 114. Port 254G communicates with a fluid line 288. Port 254H communicates with a fluid line 290. Port 254I communicates with a branch 137 of fluid line 136. Branch 137 communicates with solenoid 244 and with fluid line 136 via flow orifices 291. Port 254K communicates with fluid line 136 via a flow orifice 296.

The first mode valve assembly 254 further includes a valve 292 slidably disposed within a bore 293. The valve 292 is actuated by the solenoid 244 and a spring 294. When solenoid 244 is opened, fluid from line 136 communicates through solenoid 244 and moves the valve 292 against the spring 294. Accordingly, the valve 292 is moveable between a stroked position where the spring 294 is compressed and a de-stroked position, shown in FIG. 1C. Also acting against the spring 294 is the reverse oil (i.e. the hydraulic fluid used to initiate a reverse gear state) delivered to port 254H communicated via fluid line 290, the second mode valve assembly 256, fluid line 286, and fluid line 284 from the ETRS valve assembly 250. Acting with the spring 294 on the valve 292 is either out of park oil or return to park oil communicated via fluid line 280 from the ETRS valve assembly 250. In the stroked position, solenoid 244 is opened and fluid from line 137 contacts the valve 292 and moves the valve 292 against the spring 294. In this condition, port 254B communicates with port 254J and exhausts, ports 254C and 254D communicate with port 254E, port 254G communicates with port 254F and exhausts, and port 254K is closed.

In the de-stroked position, solenoid 244 is closed and the valve 292 is positioned by the spring 294 and hydraulic fluid via line 280. In this position, port 254B communicates with port 254C, ports 254E and 254D communicate with port 254F and exhaust, and port 254G communicates with port 254K. Accordingly, by stroking and de-stroking the valve 292, hydraulic fluid is diverted between fluid lines 282, 288 and fluid line 286.

The latch valve assembly 252 generally includes ports 252A-E. Ports 252A and 252B are exhaust ports that communicate with the sump 114. Port 252C communicates with a fluid line 300. Port 252D communicates with fluid line 280. Port 252E communicates with a fluid line 301 that in turn communicates with solenoid 246. The latch valve assembly 252 includes a valve 303 slidably disposed within a bore 305. The valve 303 is actuated by the solenoid 246 and a spring 307. When solenoid 246 is opened, fluid from line 136 communicates through solenoid 246 and line 301 and moves the valve 303 against the spring 307. The valve 303 is moveable between a stroked position where the spring 307 is compressed, shown in FIG. 1C, and a de-stroked position where the spring 307 is not compressed. In the stroked position, port 252C communicates with port 252B and exhausts and port 252D is blocked. In the de-stroked position, port 252C communicates with port 252D. The latch valve assembly 252 is operable to latch or engage the second mode valve assembly 256.

A ball check valve 309 is disposed between the ETRS valve 250 and the latch valve 252. The ball check valve 309 includes three ports 309A-C. Port 309A communicates with fluid line 260. Port 309B communicates with fluid line 266. Port 309C communicates with fluid line 280. The ball check valve 309 closes off whichever of the ports 309A and 309B that is delivering the lower hydraulic pressure and provides communication between whichever of the ports 309A and 309B having or delivering the higher hydraulic pressure and the outlet port 309C.

The second mode valve assembly 256 includes ports 256A-N. Ports 256A, 256D, 256J, and 256M are exhaust ports that communicate with the sump 114. Port 256B communicates with fluid line 300. Ports 256C and 256G communicate with a fluid line 302. Port 256E communicates with fluid line 290. Port 256F communicates with fluid line 286. Port 256H communicates with fluid line 282. Port 256I communicates with fluid line 187 that feeds solenoid 186. Port 256K communicates with fluid line 288. Port 256L communicates with a fluid line 306. Port 256N communicates with a fluid line 308.

The second mode valve assembly 256 further includes a valve 310 slidably disposed within a bore 312. The valve 310 is actuated by the solenoid 246 via the latch valve 252 and a spring 314 or directly through fluid line 301 and ball check valve 320. The valve 310 is moveable between a stroked state where the spring 314 is compressed, shown in FIG. 1C, and a de-stroked position. When solenoid 246 is opened, hydraulic fluid is communicated via line 301 to both the second mode valve assembly 256 and the latch valve assembly 252. The fluid communicated to the latch valve assembly 252 moves the valve 303 to its stroked state, thereby allowing communication from the solenoids 240 and 242 to the spring side of the valve 310 of the second mode valve assembly 256. If either solenoids 240 or 242 are opened (i.e. activating an out-of-Park or return to Park condition), hydraulic fluid communicates through ball check valve 309, to line 280, through the latch valve assembly 252, and to the second mode valve assembly 256 via line 300. This hydraulic fluid then keeps the valve 310 in the second position. If no fluid from solenoids 240 and 242 contact valve 310, the hydraulic fluid communicated from solenoid 246 moves the valve 310 to its stroked state.

In the stroked position, port 256C communicates with port 256D and exhausts, port 256E communicates with port 256F, port 256G is blocked, port 256I communicates with port 256H, port 256J is blocked, port 256L communicates with port 256K, and port 256M is blocked. In the de-stroked position, port 256C is blocked, port 256E communicates with port 256D and exhausts, port 256G communicates with port 256F, port 256H is blocked, port 256I communicates with port 256J and exhausts, port 256K is blocked, and port 256L communicates with port 256M and exhausts.

A latch oil circuit is defined by fluid line 136, fluid line 288, fluid line 306, a ball check valve 320, and fluid line 308. The ball check valve 320 includes three ports 320A-C. Port 320A communicates with fluid line 301. Port 320B communicates with fluid line 306. Port 320C communicates with fluid line 308. The ball check valve 320 closes off whichever of the ports 320A and 320B that is delivering the lower hydraulic pressure and provides communication between whichever of the ports 320A and 320B having or delivering the higher hydraulic pressure and the outlet port 320C. Latch oil is communicated through the latch oil circuit from line 136 when the first mode valve assembly 254 is in the de-stroked position and the second mode valve assembly 256 is in the stroked position. The latch oil communicates from line 136 through the first mode valve assembly 254, through line 288, through the second mode valve assembly 256, through line 306, through the ball check valve 320, and through line 308 to act on the valve 310.

Figure 1C:
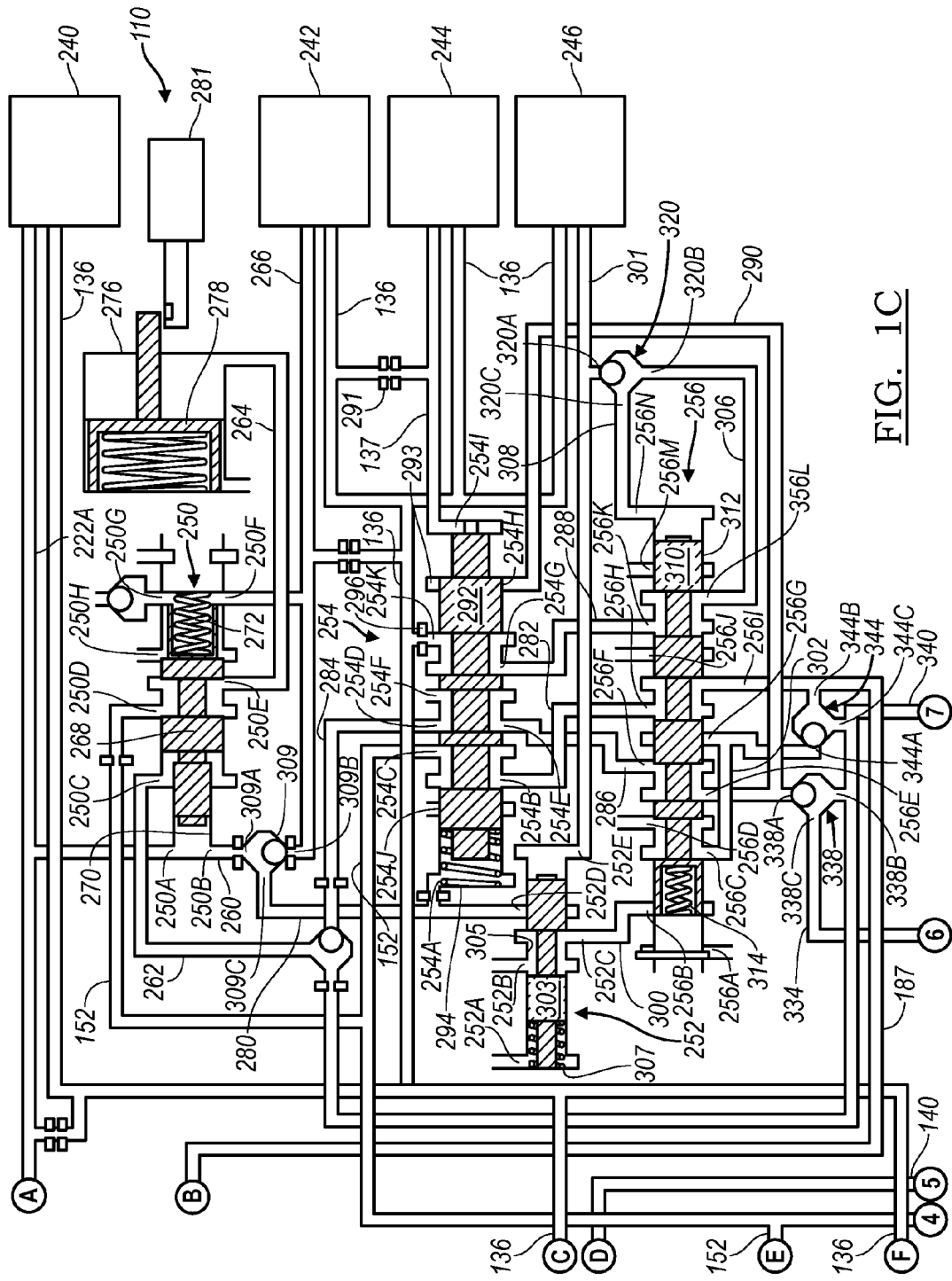
Figure 1D:
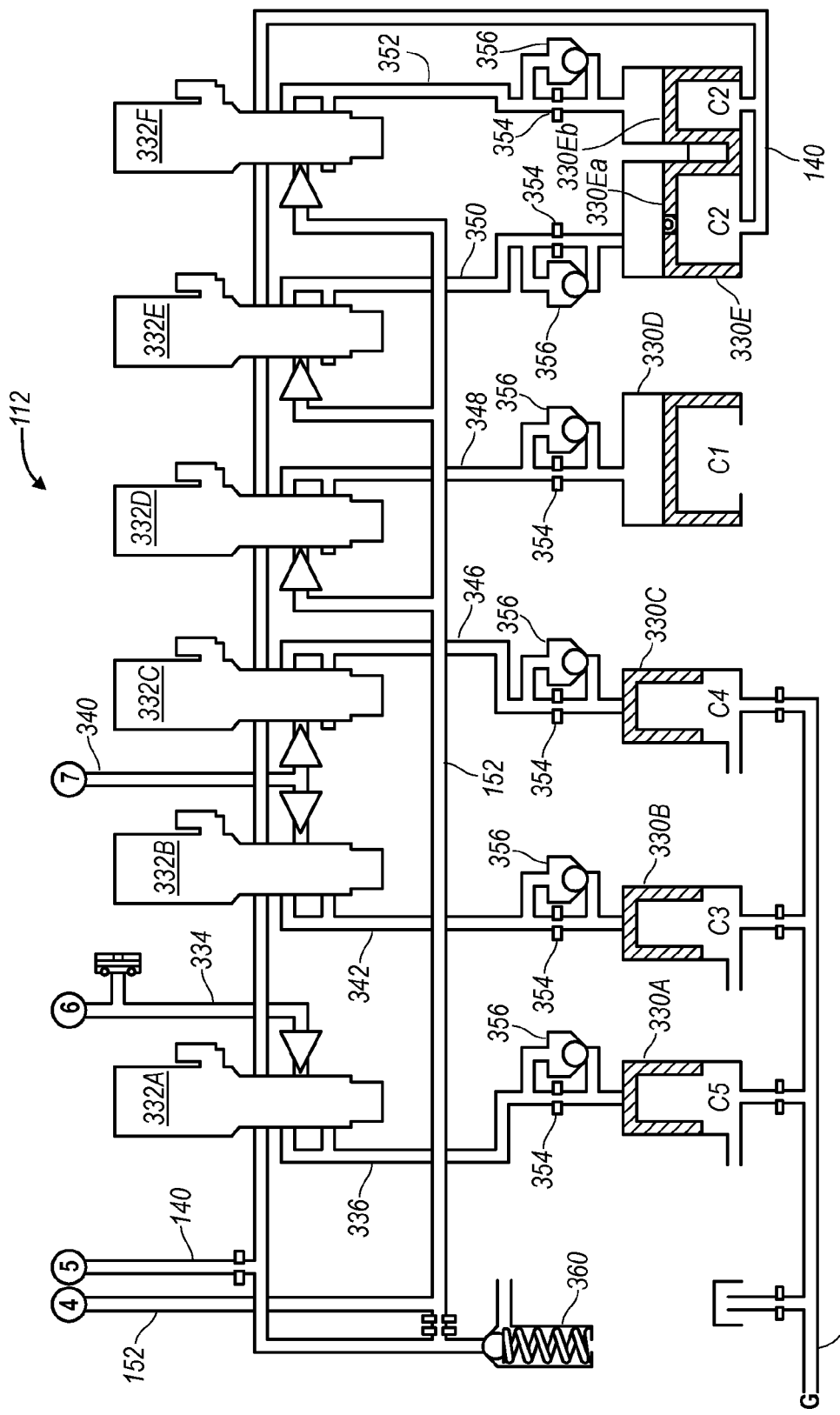

With reference to FIG. 1D and continued reference to FIG. 1C, the clutch control subsystem 112 provides hydraulic fluid to clutch actuators 330A-E. The clutch actuators 330A-E are hydraulically actuated pistons that each engage one of the plurality of torque transmitting devices to achieve various speed ratios. Clutch actuator 330E includes two apply areas 330Ea and 330Eb. Each of the clutch actuators 330A-E are controlled by a variable force solenoid 332A-F, with clutch actuator 330E controlled by two variable force solenoids 332E and 332F. This separate control of clutch actuator 330E provides maximum flexibility to tailor clutch torque characteristics to a wide range of high torque and low torque shifting conditions.

Solenoid 332A is in communication with a fluid line 334 and with a fluid line 336. Fluid line 334 communicates with a ball check valve 338. The ball check valve 338 includes three ports 338A-C. Port 338A communicates with fluid line 290. Port 338B communicates with a fluid line 340. Port 338C communicates with fluid line 334. The ball check valve 338 closes off whichever of the ports 338A and 338B that is delivering the lower hydraulic pressure and provides communication between whichever of the ports 338A and 338B having or delivering the higher hydraulic pressure and the outlet port 338C. Therefore, solenoid 332A is fed hydraulic fluid through the mode valves 254, 256 from fluid line 152 (i.e. by either drive oil or reverse oil and therefore can only be pressurized when the mode valves 254, 256 are positioned in the Drive or Reverse arrangement). Accordingly, an unintended gear engagement in Neutral if a clutch solenoid fails to a high pressure is prevented. Fluid line 336 delivers hydraulic fluid from the solenoid 332A to the shift actuator 330A.

Solenoid 332B is in communication with fluid line 340 and a fluid line 342. Fluid line 340 communicates with a ball check valve 344. The ball check valve 344 includes three ports 344A-C. Port 344A communicates with fluid line 302. Port 344B communicates with fluid line 187. Port 344C communicates with fluid line 340. The ball check valve 344 closes off whichever of the ports 344A and 344B that is delivering the lower hydraulic pressure and provides communication between whichever of the ports 344A and 344B having or delivering the higher hydraulic pressure and the outlet port 344C. Therefore, solenoid 332B is fed hydraulic fluid through the mode valves 254, 256 from fluid line 152 (i.e. by the drive oil and therefore can only be pressurized when the mode valves 254, 256 are positioned in the Drive arrangement). Fluid line 342 delivers hydraulic fluid from the solenoid 332B to the shift actuator 330B.

Solenoid 332C is in communication with fluid line 340 and a fluid line 346. Solenoid 332C is fed hydraulic fluid through the mode valves 254, 256 from fluid line 152 (i.e. by the drive oil and therefore can only be pressurized when the mode valves 254, 256 are positioned in the Drive arrangement). Fluid line 346 delivers hydraulic fluid from the solenoid 332C to the shift actuator 330C.

Solenoid 332D is in communication with fluid line 152 and is therefore fed hydraulic fluid from line pressure delivered by the pump 118. Solenoid 332D communicates the hydraulic fluid to the shift actuator 330D via a fluid line 348.

Solenoid 332E is in communication with fluid line 152 and is therefore fed hydraulic fluid from line pressure delivered by the pump 118. Solenoid 332E communicates the hydraulic fluid to the shift areas 330Ea via a fluid line 350.

Solenoid 332F is in communication with fluid line 152 and is therefore fed hydraulic fluid from line pressure delivered by the pump 118. Solenoid 332F communicates the hydraulic fluid to the shift area 330Eb via a fluid line 352.

Each of the shift actuators 330A-C is fed lubrication oil via fluid line 224. Each of the solenoids 332A-F and the shift actuators 330D-E exhaust through fluid line 140. A safety valve 360 in communication with fluid line 140 is set at a predetermined pressure to regulate the pressure of the hydraulic fluid within the fluid line 140. This ensures that the clutch control circuits remain full when not being used to minimize response time. Fluid line 140 is fed by feed limit pressure oil. Each of the solenoids 332A-F are chosen as either normally closed or normally open so that a single default gear can be attained in the case of electrical power loss. For example, if a sixth gear ratio is desired as the default forward speed during a power loss, solenoids 332A-C are chosen to be normally open and solenoids 332D-F are chosen to be normally closed.

In addition, each of the fluid lines 336, 342, 346, 348, 350, and 352 that feed the shift actuators 330A-F include an orifice 354 disposed in parallel with a one way valve 356. The orientation of the one-way valve 356 is such that the one way valve 356 allows communication from the clutch actuators 330A-E to the solenoids 332A-F and prevents fluid communication from the solenoids 332A-F to the shift actuators 330A-E. This arrangement forces oil feeding the shift actuators 330A-E to be controlled through the orifices 354.

The description of the invention is merely exemplary in nature and variations that do not depart from the general essence of the invention are intended to be within the scope of the invention. Such variations are not to be regarded as a departure from the spirit and scope of the invention.

The following is claimed:

1. A system comprising:
   a hydraulic fluid delivery subsystem for providing a hydraulic fluid having at least a first and a second pressure level;
   a solenoid in downstream fluid communication with the hydraulic fluid delivery subsystem, wherein the solenoid has a first operating mode and a second operating mode;
   a valve assembly in downstream fluid communication with the hydraulic fluid delivery subsystem and the solenoid, the valve assembly having a valve spool movable between a first position and a second position, wherein the valve assembly provides a hydraulic fluid at a third pressure level when the spool valve is in the first position; and
   a torque converter having a fluid coupling mode and a direct drive mode and having a torque converter inlet in downstream fluid communication with the valve assembly, a torque converter outlet in upstream fluid communication with the valve assembly, a torque converter lock-up clutch, and a clutch actuator in direct downstream fluid communication with the solenoid and operable to engage the torque converter lock-up clutch,
   wherein when the valve spool is in the first position and the solenoid is in the first operating mode the torque converter receives the hydraulic fluid at the third pressure level to enable the fluid coupling mode, and wherein when the valve spool is in the second position and the solenoid is in the second operating mode the torque converter receives the hydraulic fluid at the first pressure level to prepare for the fluid coupling mode and the clutch actuator receives the hydraulic fluid at the first pressure level to engage the direct drive mode.

2. The system of claim 1 further comprising a cooler in downstream fluid communication with the torque converter outlet through the valve assembly when the valve spool is in the first position and in downstream fluid communication with the hydraulic fluid delivery subsystem through the valve assembly when the valve spool is in the second position.

3. The system of claim 1 wherein the solenoid moves the valve spool from the first position to the second position when the solenoid is in the second operating mode.

4. The system of claim 1 further comprising a blow-off valve in downstream fluid communication with the torque converter outlet through the valve assembly when the valve spool is in the second position, the blow-off valve having a predefined release pressure that maintains a pressure of hydraulic fluid within the torque converter below or at the predefined release pressure.

5. The system of claim 1 wherein the hydraulic fluid at the third pressure level is composed of the combination within the valve assembly of the hydraulic fluid at the first pressure level and the hydraulic fluid at the second pressure level.

6. The system of claim 5 wherein the hydraulic fluid at the second pressure level generated from a feed limit valve assembly and a pressure regulator valve assembly in downstream fluid communication with a pump and the hydraulic fluid at the first pressure level is generated from the feed limit valve assembly in downstream fluid communication with the pump.

7. The system of claim 6 wherein the hydraulic fluid at the third pressure level is communicated to a cooler when the valve spool is in the first position.

8. The system of claim 5 further comprising a first gasket in fluid communication with the hydraulic fluid at the first pressure level downstream of the valve assembly and a second gasket in fluid communication with the hydraulic fluid at the second pressure level downstream of the valve assembly, wherein the first gasket has an opening diameter less than an opening diameter of the second gasket.

9. The system of claim 1 wherein the clutch actuator engages the torque converter lock-up clutch when the hydraulic fluid at the first pressure level is communicated from the solenoid to the clutch actuator.

10. The system of claim 1 wherein the solenoid is a high flow, variable force solenoid that is normally closed.

11. The system of claim 1 wherein the valve spool is biased to the first position by a spring.

12. The system of claim 1 wherein the hydraulic fluid delivery subsystem communicates with a pressure sensor through the valve assembly when the valve spool is in the first position and the the hydraulic fluid delivery subsystem does not communicate with the pressure sensor when the valve spool is in the second position.

13. A system comprising:
   a torque converter having a torque converter inlet and a torque converter outlet, the torque converter also having a clutch actuator operable to engage a torque converter lock-up clutch;
   a source of pressurized hydraulic fluid configured to provide a first primary hydraulic fluid and a second primary hydraulic fluid;
   a blow-off check valve;
   a cooler subsystem;
   a valve assembly having a first valve inlet in downstream communication with the first primary hydraulic fluid, a second valve inlet in downstream fluid communication with the second primary hydraulic fluid, a third valve inlet in downstream fluid communication with the torque converter outlet, a first valve outlet in upstream fluid communication with the torque converter inlet, a second valve outlet in upstream fluid communication with the blow-off check valve, and a third valve outlet in upstream fluid communication with the cooler subsystem, the valve assembly further including a valve movable between a first position and a second position;
   a solenoid in direct downstream fluid communication with the source of pressurized hydraulic fluid and in direct upstream fluid communication with the clutch actuator and the valve assembly when in an open configuration and not in upstream fluid communication with the clutch actuator and the valve assembly when in a closed configuration;
   wherein the first and second valve inlets are in fluid communication with the first valve outlet and the third valve inlet is in fluid communication with the third valve outlet when the valve is in the first position and the solenoid is closed, and wherein the first valve inlet is in fluid communication with the first valve outlet and the third valve inlet is in fluid communication with the second valve outlet when the valve is in the second position and the solenoid is open.

14. The system of claim 13 wherein the second valve outlet is closed by the valve when the valve is in the first position and the third valve outlet is closed by the valve when the valve is in the second position.

15. The system of claim 14 wherein the valve assembly further includes a fourth valve inlet in downstream fluid communication with the second primary hydraulic fluid and a fourth valve outlet in upstream fluid communication with the cooler subsystem, and wherein the fourth valve inlet is closed when the valve is in the first position and wherein the fourth valve inlet is in fluid communication with the fourth valve outlet when the valve is in the second position.

16. The system of claim 15 wherein the valve assembly further includes a fifth valve inlet in downstream fluid communication with the second primary hydraulic fluid and a fifth valve outlet in upstream fluid communication with a pressure sensor, and wherein the fifth valve inlet is closed when the valve is in the second position and wherein the fifth valve inlet is in fluid communication with the fifth valve outlet when the valve is in the first position.

17. The system of claim 13 wherein the solenoid moves the valve from the first position to the second position when the solenoid is open.

18. The system of claim 13 wherein the first primary hydraulic fluid is generated from a feed limit valve assembly and the second primary hydraulic fluid is generated from the feed limit valve assembly and a pressure regulator valve assembly in upstream fluid communication with the feed limit valve assembly.

19. The system of claim 13 further comprising a first gasket in fluid communication with the first primary hydraulic fluid downstream of the valve assembly and a second gasket in fluid communication with the second primary hydraulic fluid downstream of the valve assembly, wherein the first gasket has an opening diameter less than an opening diameter of the second gasket.

\* \* \* \* \*